US008468493B2

(12) United States Patent  
Nagayama et al.

(10) Patent No.: US 8,468,493 B2  
(45) Date of Patent: Jun. 18, 2013

(54) INFORMATION PROCESSING APPARATUS, INFORMATION PROCESSING METHOD, AND PROGRAM

(75) Inventors: Tomohiko Nagayama, Tokyo (JP); Yoshiaki Hirano, Kanagawa (JP); Yuji Hiura, Kanagawa (JP); Tadafumi Oyama, Tokyo (JP)

(73) Assignee: Sony Corporation, Tokyo (JP)

( * ) Notice: Subject to any disclaimer, the term of this patent is extended or adjusted under 35 U.S.C. 154(b) by 1431 days.

(21) Appl. No.: 11/797,135

(22) Filed: May 1, 2007

(65) Prior Publication Data

US 2007/0260657 A1    Nov. 8, 2007

(30) Foreign Application Priority Data

May 17, 2006  (JP) ................................ P2006-137132

(51) Int. Cl.  
*G06F 9/44*     (2006.01)

(52) U.S. Cl.  
USPC ........................................................ 717/108

(58) Field of Classification Search  
None  
See application file for complete search history.

(56) References Cited

U.S. PATENT DOCUMENTS

| | | | | |
|---|---|---|---|---|
| 5,854,891 A * | 12/1998 | Postlewaite et al. | ............ | 726/20 |
| 6,449,720 B1 * | 9/2002 | Sprague et al. | ............... | 713/171 |
| 6,618,857 B1 * | 9/2003 | Zimniewicz et al. | ......... | 717/175 |
| 6,895,506 B1 | 5/2005 | Abu-Husein | | |
| 6,988,263 B1 * | 1/2006 | Hussain et al. | ............... | 717/128 |
| 7,000,835 B2 * | 2/2006 | Komatsu | ....................... | 235/437 |
| 7,152,230 B2 * | 12/2006 | Sato et al. | ..................... | 717/178 |
| 2003/0125083 A1 * | 7/2003 | Iwasaki | .......................... | 455/558 |
| 2005/0176473 A1 * | 8/2005 | Melpignano | .................. | 455/574 |

FOREIGN PATENT DOCUMENTS

| | | |
|---|---|---|
| JP | 06-119262 A | 4/1994 |
| JP | 2003-526965 A | 9/2003 |
| JP | 2004-215255 A | 7/2004 |
| JP | 2005-196695 | 7/2005 |
| WO | WO-00/70429 A1 | 11/2000 |
| WO | WO-2004/044825 | 5/2004 |
| WO | WO-2005/069195 | 7/2005 |

OTHER PUBLICATIONS

European Extended Search Report and Opinion issued Jan. 8, 2009 for corresponding European Application No. 07 25 2002.  
Australian Search Report; Application No. SG 200703235-2; Dated: May 4, 2007.

* cited by examiner

*Primary Examiner* — Wei Zhen  
*Assistant Examiner* — Adam R Banes  
(74) *Attorney, Agent, or Firm* — Rader, Fishman & Grauer PLLC

(57) ABSTRACT

A method of processing information of an apparatus including first storage means for storing an encrypted application program and data, second storage means for loading a decrypted application program and data and execution means for executing the application program loaded in the second storage section, and controlling a reader/writer reading data from and writing data into a non-contact IC card by executing an application program. The method includes, in response to starting a first application program, reading data corresponding to a second application program different from the first application program from the second storage means; encrypting the read data; storing the encrypted data into the first storage means; clearing the second storage means; reading the encrypted first application program and data from the first storage means; decrypting the read encrypted first application program and data; and loading the decrypted first application program and data in the second storage means.

9 Claims, 7 Drawing Sheets

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2006-137132 filed in the Japanese Patent Office on May 17, 2006, the entire contents of which are incorporated herein by reference.

BACKGROUND OF THE INVENTION

1. Field of the Invention

The present invention relates to an information processing apparatus, method and program. More particularly, the present invention relates to an information processing apparatus, an information processing method, and program for controlling a reader/writer reading data from and writing data onto a non-contact IC (Integrated Circuit) card by executing an application program in accordance with a type of service provider using the non-contact IC card.

2. Description of the Related Art

A plurality of service providers are providing services using a non-contact IC card typified by FeliCa (registered trademark). For example, a first service provider provides a non-contact IC card with functions of a commuter pass for a railway, etc., a ticket, electronic money, etc. Also, a second service provider provides a non-contact IC card with a function of electronic money (for example, refer to Japanese Unexamined Patent Application Publication No. 2004-215255).

In the following, a service provided by the first service provider, the non-contact IC card, and the reader/writer corresponding to the service are described as a first service, a first non-contact IC card, and a first reader/writer, respectively. A service provided by the second service provider, the non-contact IC card, and the reader/writer corresponding to the service are described in the same manner.

To date, the first reader/writer has been capable of communicating data with only the first non-contact IC card, and has not been capable of communicating data with the second non-contact IC card. This is the same for the second reader/writer.

Accordingly, for example, if a certain store attempts to handle both the first service and the second service, it is necessary for the store to be provided with the two reader/writers, namely, the first reader/writer and the second reader/writer.

However, it costs too much to dispose two similar apparatuses in one store, and the utilization efficiency of the space allocation for the reader/writer is deteriorated. Thus, it is desirable to enable one reader/writer to communicate with a plurality of non-contact IC cards corresponding to a plurality of different services.

SUMMARY OF THE INVENTION

In order to relate one reader/writer to a plurality of services, it is necessary for the control unit that controls the reader/writer to execute an application program (in the following, described as an AP) corresponding to each service. However, each service is independent individually, and thus it is necessary to protect an AP corresponding to each service and the data processed by that AP from being accessed by the other Aps.

For this purpose, the control unit should restrict the number of Aps that can be executed at the same time to one, and should change Aps to be executed as necessary.

When a control unit (in the following referred to as an AP changing unit) changes a plurality of APs to be executed, there are the following ways. One way is to divide a memory area for each AP, and to dynamically allocate an address space to a divided memory area (for example, a management method using MMU (Memory Management Unit)). Another way is to divide the memory area for each AP, and to create binary code that meets the divided memory area.

However, in either way, there are the following problems. When the hardware resource for an AP changing unit is not sufficient, the security setting by the memory-area division is complicated. Also, when an AP changing unit holds a plurality of APs, APs not being executed and the processing data are held in a state of plaintext in a memory connected with a bus, and thus there is a risk of being accessed by another AP in execution. Furthermore, it becomes necessary to perform processing of logical address conversion for each occurrence of access to the memory, thereby giving a great influence on the performance of the AP.

The present invention has been made in view of these circumstances. When APs individually corresponding to a plurality of services using a non-contact IC card are changed to be executed, it is desirable to protect an AP and the corresponding data from being accessed from another AP.

According to an embodiment of the present invention, there is provided an information processing apparatus for controlling a reader/writer reading data from and writing data into a non-contact IC (Integrated Circuit) card by executing an application program in accordance with a type of service using the non-contact IC card, the information processing apparatus including: an obtaining section obtaining an application program in accordance with a type of service using the non-contact IC card; an encryption section encrypting the obtained application program and processing data processed by the application program; a decryption section decrypting the encrypted application program and corresponding processing data; a first storage section storing the encrypted application program and corresponding processing data; a second storage section to which the decrypted application program and corresponding processing data are loaded; a management section managing the first and the second storage sections; and an execution section executing the application program loaded to the second storage section, wherein in response to an instruction to start a first application program, the management section reads processing data corresponding to a second application program different from the first application program from the second storage section, causes the encryption section to encrypt the read processing data, stores the encrypted processing data into the first storage section, clears the second storage section, then reads the encrypted first application program and corresponding processing data from the first storage section, causes the decryption section to decrypt the read encrypted first application program and corresponding processing data, and loads the decrypted first application program and corresponding processing data into the second storage section.

In the above embodiment, in response to an instruction to start a first application program, the execution section may determine whether the first application program has been loaded into the second storage section, when it is determined that the first application program has not been loaded into the second storage section, the management section may read processing data corresponding to a second application program different from the first application program from the second storage section, may cause the encryption section to encrypt the read processing data, may store the encrypted processing data into the first storage section, clears the second storage section, then may read the encrypted first application program and corresponding processing data from the first storage section, may cause the decryption section to decrypt the read encrypted first application program and corresponding processing data, and may load the decrypted first application program and corresponding processing data into the second storage section.

In the above embodiment, the first storage section may be a nonvolatile memory, and the second storage section may be a volatile memory.

The information processing apparatus according to an embodiment of the present invention may further include a non-contact communication section reading data from and writing data onto the non-contact IC card.

According to another embodiment of the present invention, there is provided a method of processing information of an information processing apparatus including a first storage section storing an encrypted application program and corresponding processing data, a second storage section loading a decrypted application program and corresponding processing data, and an execution section executing the application program loaded in the second storage section, and controlling a reader/writer reading data from and writing data into a non-contact IC (Integrated Circuit) card by executing an application program in accordance with a type of service using the non-contact IC card, the method of processing information, including the steps of: in response to an instruction to start a first application program, reading processing data corresponding to a second application program different from the first application program from the second storage section; encrypting the read processing data; storing the encrypted processing data into the first storage section; clearing the second storage section; reading the encrypted first application program and corresponding processing data from the first storage section; decrypting the read encrypted first application program and corresponding processing data; and loading the decrypted first application program and corresponding processing data into the second storage section.

According to another embodiment of the present invention, there is provided a program for controlling an information processing apparatus including first storage means for storing processing data corresponding to an encrypted application program, second storage means for loading processing data corresponding to a decrypted application program, and execution means for executing the application program loaded in the second storage section, and controlling a reader/writer reading data from and writing data into a non-contact IC (Integrated Circuit) card by executing an application program in accordance with a type of service using the non-contact IC card, the program causing an execution means to execute processing information, including the steps of: in response to an instruction to start a first application program, reading processing data corresponding to a second application program different from the first application program from the second storage means; encrypting the read processing data, storing the encrypted processing data into the first storage means; clearing the second storage means; reading the encrypted first application program and corresponding processing data from the first storage means; decrypting the read encrypted first application program and corresponding processing data; and loading the decrypted first application program and corresponding processing data into the second storage means.

In an embodiment according to the present invention, in response to an instruction to start a first application program, processing data corresponding to a second application program different from the first application program is read from the second storage means, the read processing data is encrypted, and the encrypted processing data is saved into the first storage means. Furthermore, the second storage means is cleared, the encrypted first application program and the corresponding processing data are read from the first storage means, the read encrypted first application program and the corresponding processing data are decrypted, and the decrypted first application program and the corresponding processing data are loaded into the second storage means.

In an embodiment of the present invention, it is possible to change and execute APs individually corresponding to a plurality of services using a non-contact IC card. Also, in another embodiment of the present invention, it is possible to protect an AP corresponding to a plurality of services using a non-contact IC card and the corresponding data from being accessed by the other APs with each other.

DESCRIPTION OF THE PREFERRED EMBODIMENTS

Figure 1:
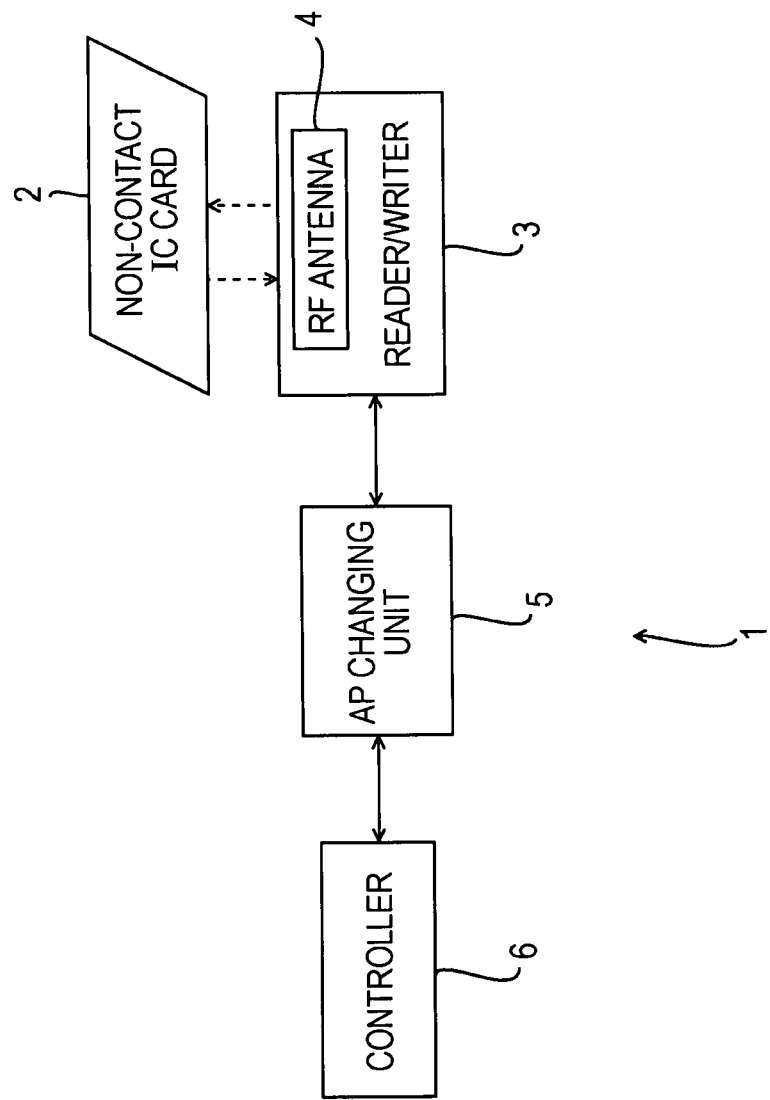
FIG. 1 is a block diagram illustrating an example of the configuration of a non-contact IC card communication system to which the present invention is applied.

In the following, a description will be given of an embodiment of the present invention. The relationship between the constituent features of the present invention and the embodiment described in the specification or the drawings is exemplified as follows. This description is for confirming that an embodiment supporting the present invention is included in the specification or the drawings. Accordingly, if there is an embodiment included in the specification or the drawings, but not included here as an embodiment corresponding to the constituent features, the fact does not mean that the embodiment does not corresponds to the constituent features. On the contrary, if an embodiment is described here as corresponding to the constituent features, the fact does not mean the embodiment does not correspond to the features other than the constituent features.

An information processing apparatus (for example, the AP changing unit 5 of FIG. 2) according to an embodiment of the present invention includes: an obtaining section (for example, the external communication section 32 in FIG. 5) obtaining an application program in accordance with a type of service using the non-contact IC card; an encryption section (for example, the encryption section 34 in FIG. 5) encrypting the obtained application program and processing data processed by the application program; a decryption section (for example, the decryption section 35 in FIG. 5) decrypting the encrypted application program and the corresponding processing data; a first storage section (for example, the nonvolatile memory 18 in FIG. 2) storing the encrypted application program and the corresponding processing data; a second storage section (for example, the memory 17 in FIG. 2) to which the decrypted application program and the corresponding processing data are loaded; a management section (for example, the memory management section 33 in FIG. 5) managing the first and the second storage sections; and an execution section (for example, the AP execution section 36 in FIG. 5) executing the application program loaded to the second storage section.

An information processing apparatus according to the embodiment may further include a non-contact communication section (for example, the reader/writer 3 in FIG. 1) reading data from and writing data onto the non-contact IC card.

Figure 7:
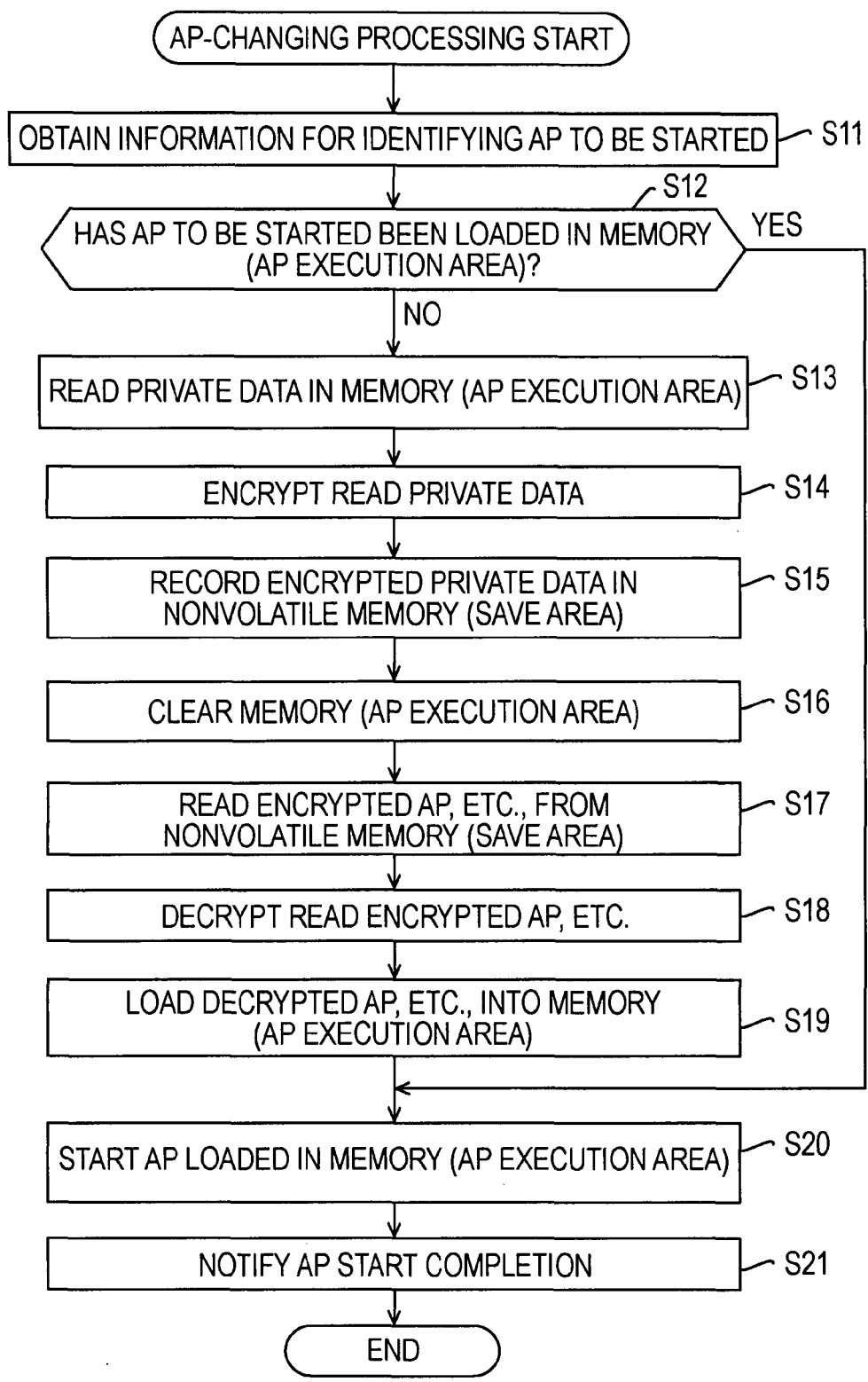
FIG. 7 is a flowchart illustrating AP changing processing.

An information processing method and program according to an embodiment of the present invention include the steps of: in response to an instruction to start a first application program, reading the processing data corresponding to a second application program different from the first application program from the second storage section (for example, step S13 in FIG. 7); encrypting the read processing data (for example, step S14 in FIG. 7), storing the encrypted processing data into the first storage section (for example, step S15 in FIG. 7); clearing the second storage section (for example, step S16 in FIG. 7); reading the encrypted first application program and the corresponding processing data from the first storage section (for example, step S17 in FIG. 7); decrypting the read encrypted first application program and the corresponding processing data (for example, step S18 in FIG. 7); and loading the decrypted first application program and the corresponding processing data to the second storage section (for example, step S19 in FIG. 7).

In the following, a detailed description will be given of a specific embodiment of the present invention with reference to the drawings.

FIG. 1 illustrates an example of the configuration of a non-contact IC card communication system according to an embodiment of the present invention. This non-contact IC card communication system 1 includes a reader/writer 3 for reading data from and writing data onto a non-contact IC card 2, an AP changing unit 5 for controlling the reader/writer 3 by executing an AP, and a controller 6 for specifying an AP to be executed by the AP changing unit 5.

The non-contact IC card 2 generates electricity by electromagnetic induction using the electromagnetic waves radiated from an RF antenna 4 embedded in the reader/writer 3, performs data communication with the reader/writer 3 using the generated electric power, and records data in the non-contact IC card 2.

The reader/writer 3 can handle a plurality of non-contact IC cards 2 whose providers are individually different by changing APs to be executed in the AP changing unit 5.

The AP changing unit 5 executes the AP specified by the controller 6 out of a plurality of APs held in advance. Also, the AP changing unit 5 can add a new AP from the outside and hold it under the control of the controller 6. Thus, it is possible to increase the types of non-contact IC cards 2 that can be handled by the reader/writer 3.

The controller 6 corresponds to, for example the user's operation for selecting the type of non-contact IC card 2, and controls the AP changing unit 5 to execute the AP corresponding to the selected service. Also, the controller 6 allows the AP changing unit 5 to obtain a new AP. Accordingly, it is possible to increase the number of supporting service providers, and to handle the revision of an AP, etc.

Figure 2:
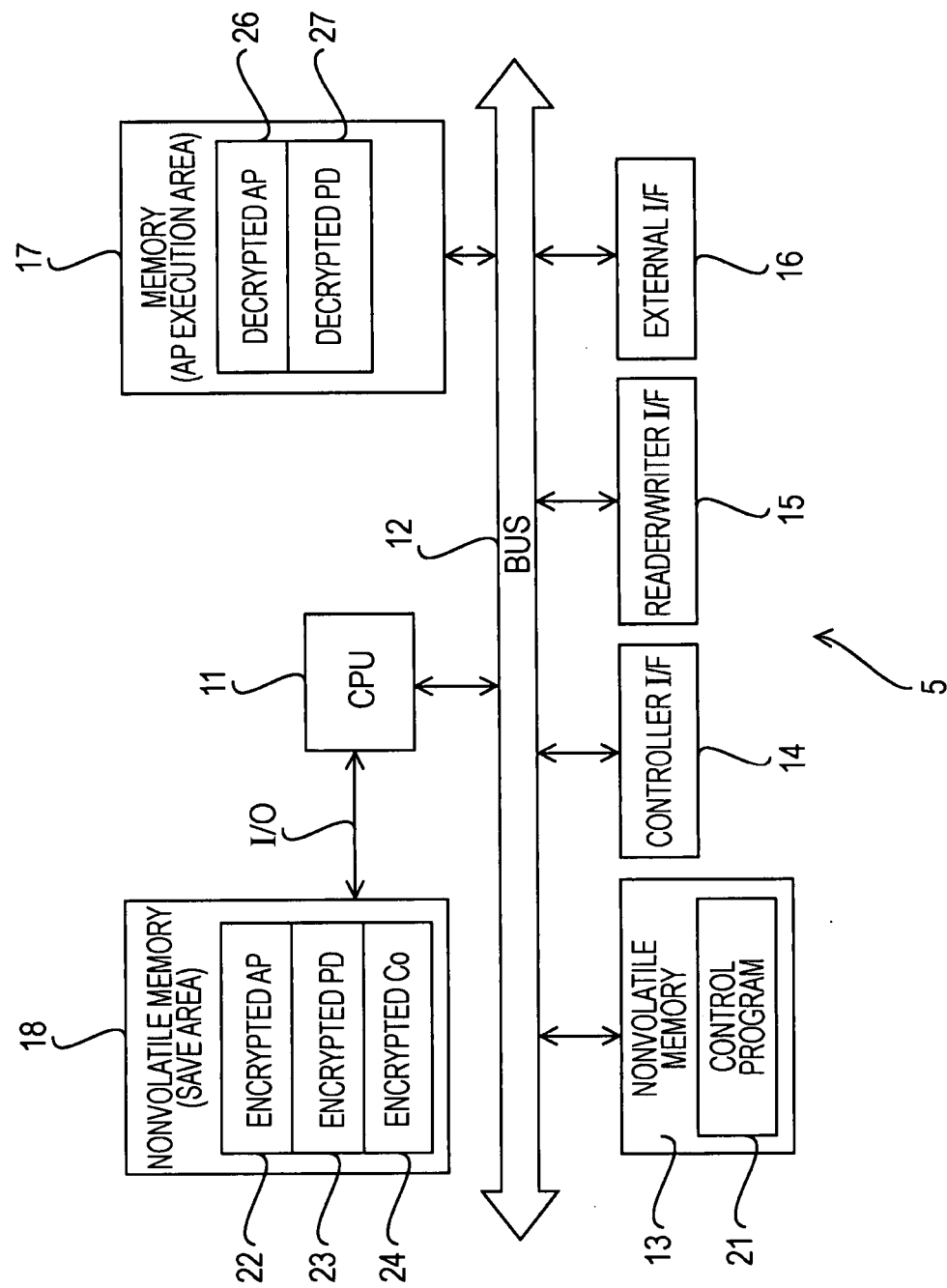
FIG. 2 is a block diagram illustrating an example of a first configuration of an AP changing unit.

FIG. 2 illustrates an example of a first configuration of the AP changing unit 5. The AP changing unit 5 includes a CPU 11 for executing various programs described below, a nonvolatile memory 13 connected to the CPU 11 through a bus 12 for storing a control program 21 controlling the basic operation of the AP changing unit 5, a controller I/F (interface) 14 to which the controller 6 is connected, a reader/writer I/F 15 to which the reader/writer 3 is connected, an external I/F 16 connected to an external device, a memory 17 used for an AP execution area, and a nonvolatile memory 18, which is I/O-connected to the CPU 11, used for a save area of an AP, etc.

The memory 17 is provided with an AP execution area having constantly the same size on the same address. A decrypted AP 26 to be executed and private data (in the following, described as a PD) 27 processed by the AP 26 are loaded into the AP execution area. In this regard, the memory 17 may be a volatile memory or a nonvolatile memory. If a volatile memory, which is lower in price than a nonvolatile memory, is used, the production cost can be reduced.

The nonvolatile memory 18 holds an AP 22, a PD 23 processed only by the corresponding AP, and content data (in the following described as Co) 24 processed only by the corresponding AP. In this regard, any one of AP, PD, and Co is held by having been encrypted. However, they may be held without being encrypted in accordance with the necessity for secrecy.

Figure 3:
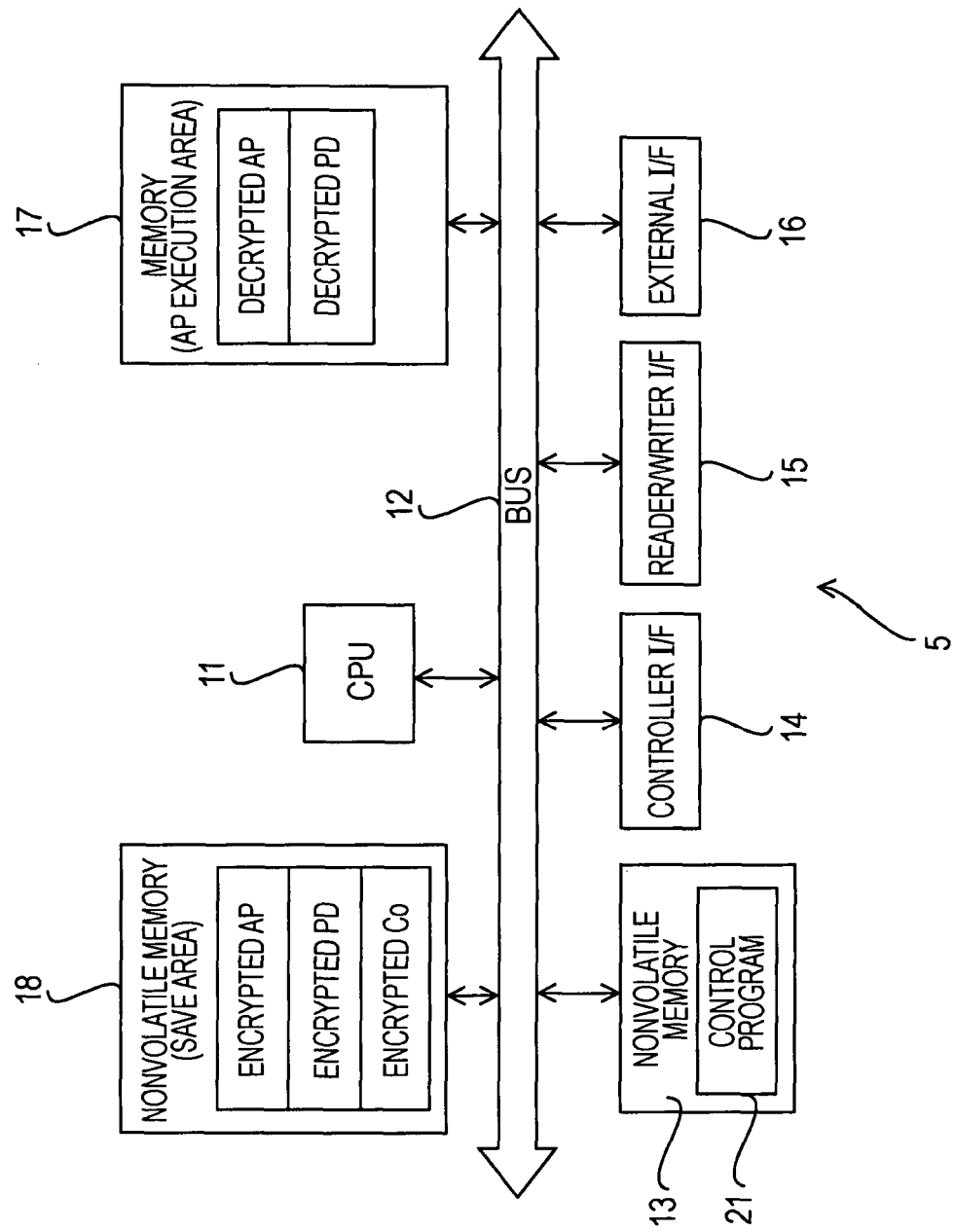
FIG. 3 is a block diagram illustrating an example of a second configuration of an AP changing unit.
Figure 4:
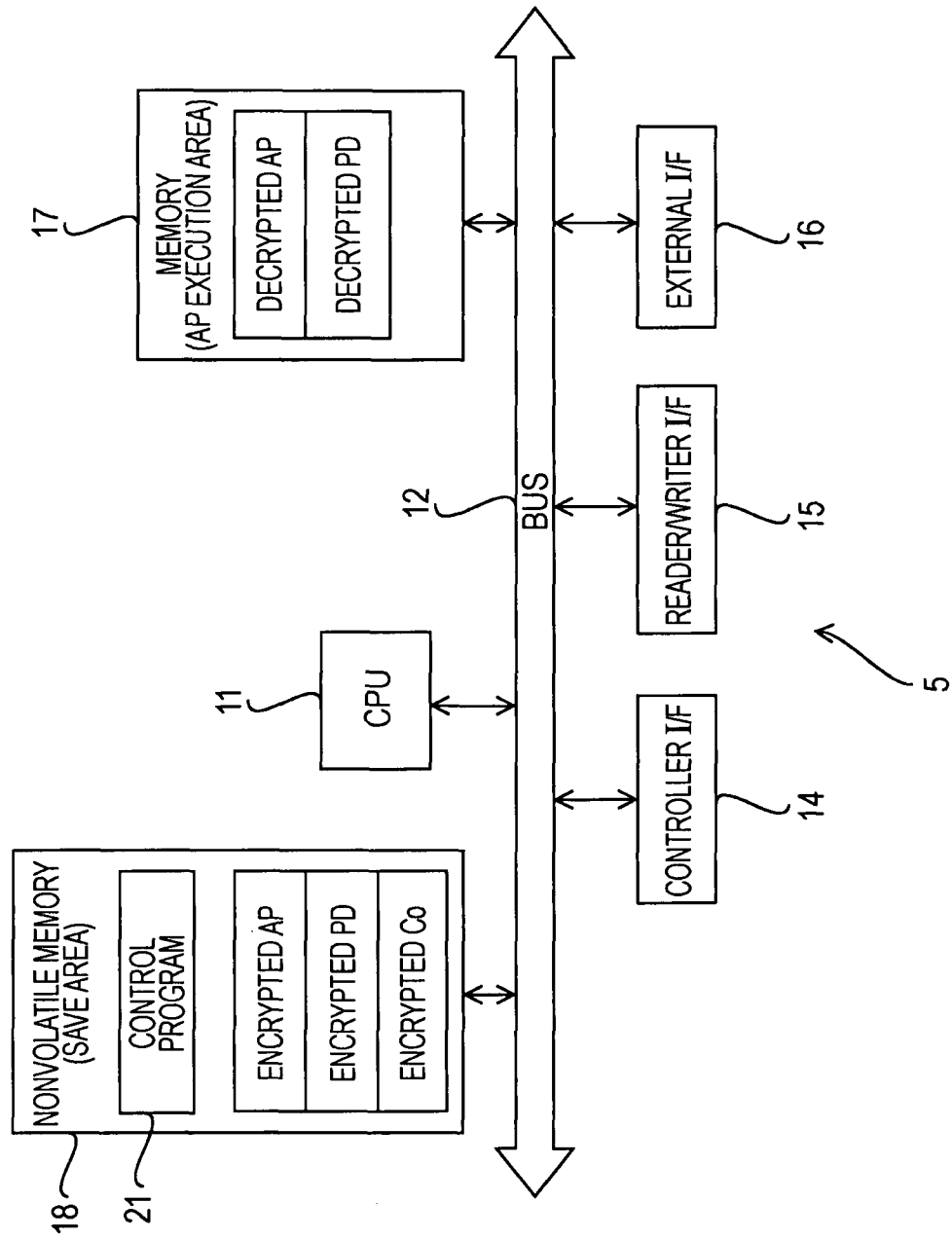
FIG. 4 is a block diagram illustrating an example of a third configuration of an AP changing unit.

In this regard, the nonvolatile memory 18 may not be I/O connected to the CPU 11, and may be connected to the CPU 11 through the bus 12 as shown in FIG. 3. Also, as shown in FIG. 4, the nonvolatile memory 13 may be omitted, and the control program 21 may be stored in the nonvolatile memory 18. Also, the memory 17 may be omitted, and the AP execution area may be disposed in the nonvolatile memory 18.

Figure 5:
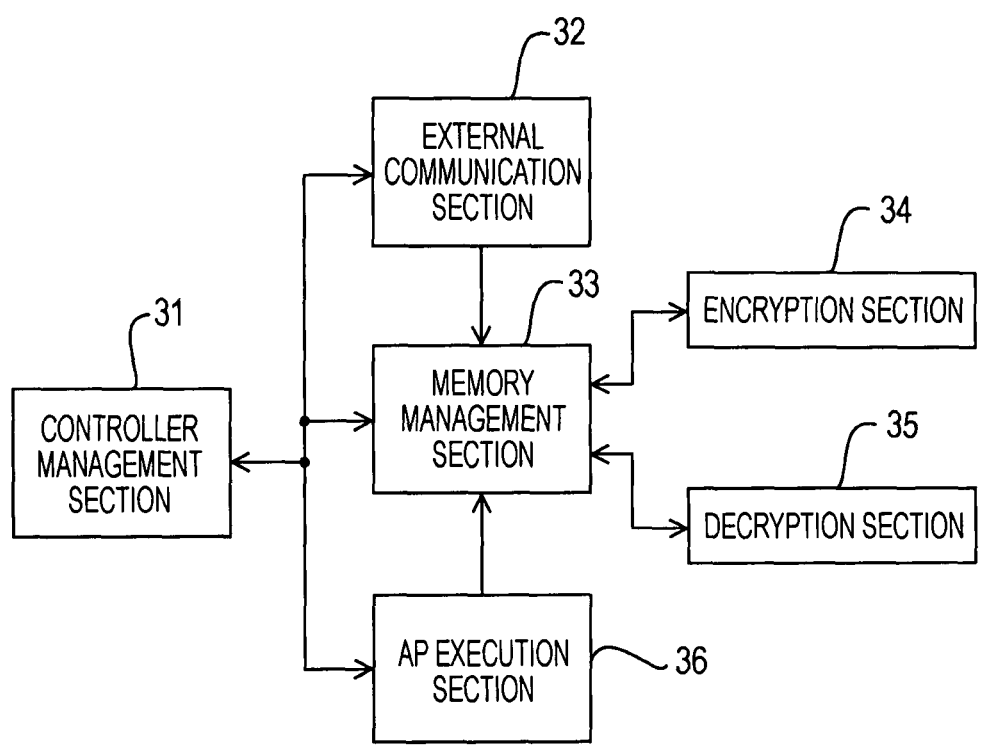
FIG. 5 is a block diagram illustrating an example of the configuration of functional blocks of the control program of an AP changing unit.

Next, FIG. 5 illustrates an example of the configuration of functional blocks achieved by the CPU 11 of the AP changing unit 5 executing the control program 21.

A controller management section 31 receives a command sent from the controller 6 connected through the controller I/F 14, and controls an external communication section 32, a memory management section 33, and an AP execution section 36 in accordance with the received command. Also, after the completion of the processing corresponding to the received command, the controller management section 31 notifies the completion of that processing to the controller 6.

The external communication section 32 obtains an AP and the Co corresponding to the AP, etc., from the external device (a drive supporting a predetermined recording medium, a server on a network, or the like) connected through the external I/F 16 under the control of the controller management section 31.

The memory management section 33 controls the reading and writing of an AP, etc., on the memory 17 and the nonvolatile memory 18 in accordance with the control by the controller management section 31. An encryption section 34 encrypts an AP, etc., to be held in the nonvolatile memory 18 under the control of the memory management section 33. A decryption section 35 decrypts an AP, etc., read from the nonvolatile memory 18 under the control of the memory management section 33.

The AP execution section 36 determines whether the AP to be executed has been loaded in the memory 17 under the control of the controller management section 31. Also, the AP execution section 36 executes an AP loaded into the memory 16.

In this regard, the functional blocks shown in FIG. 5 may be achieved by hardware.

Next, a description will be given of the operation of the AP changing unit 5.

Figure 6:
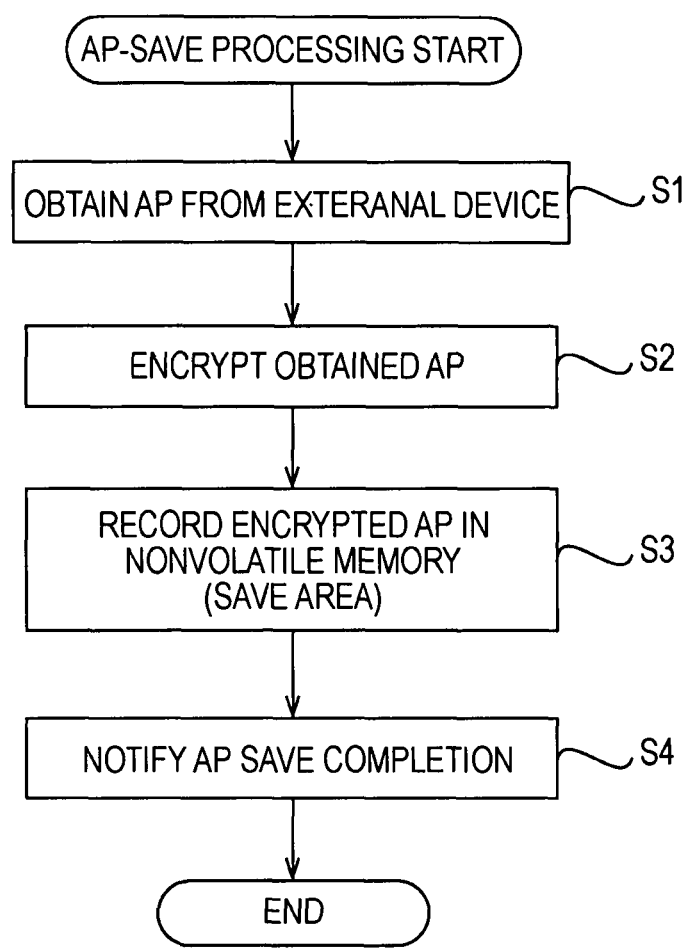
FIG. 6 is a flowchart illustrating AP save processing.

First, with reference to the flowchart in FIG. 6, a description will be given of the processing (in the following, described as AP save processing) which obtains an AP and content data from the external device and saves them in the nonvolatile memory 18.

This AP save processing is started when a command instructing to obtain a new AP and content data (in the following, described as an AP, etc.) is sent from the controller 6, and the command is received by the controller management section 31.

In step S1, the external communication section 32 obtains an AP, etc., from an external device and outputs the obtained AP, etc., to the memory management section 33 under the control of the controller management section 31. In step S2, the memory management section 33 outputs the AP, etc., input from the external communication section 32 to the encryption section 34 to perform encryption under the control of the controller management section 31.

In step S3, the memory management section 33 records the encrypted AP, etc., into the nonvolatile memory 18 provided with an AP save area. In step S4, the memory management section 33 sends a notification indicating the completion of saving the AP to the controller management section 31. In response to this notification, the controller management section 31 outputs the similar notification to the controller 6. Then, the AP save processing is terminated.

By the above-described AP save processing, the AP, etc., added to the AP changing unit 5 are encrypted and saved in the AP save area of the nonvolatile memory 18, and thus it is possible to keep the AP, etc., secret from the other APs.

Next, with reference to the flowchart in FIG. 7, a description will be given of the processing (in the following, described as AP changing processing) which starts an AP and changes APS in execution.

This AP changing processing is started when a command instructing to start or change APs is sent from the controller 6, and the command is received by the controller management section 31.

In step S11, the controller management section 31 obtains information identifying an AP to be started from the controller 6, and notifies the obtained information to the AP execution section 36.

In step S12, the AP execution section 36 determines whether the AP to be started has been loaded into the AP execution area disposed in the memory 17 on the basis of the notification from the controller management section 31. If it is determined that the AP to be started has not been loaded into the AP execution area in the memory 17, another AP has been loaded into the AP execution area in the memory 17 and might be running. Thus, the processing proceeds to step S13 in order to conceal the PD to be processed only by the loaded AP from the AP to be started.

In step S13, the AP execution section 36 requests the memory management section 33 to record the private data in the AP execution area of the memory 17. In response to this request, the memory management section 33 reads the private data from the AP execution area of the memory 17, and outputs the data to the encryption section 34. In step S14, the encryption section 34 encrypts the private data input from the memory management section 33, and returns the data to the memory management section 33. In step S15, the memory management section 33 records the encrypted private data into the AP save area of the nonvolatile memory 18. Furthermore, the memory management section 33 notifies the AP execution section 36 that the encrypted private data has been recorded into the AP save area of the nonvolatile memory 18.

In step S16, the AP execution section 36 clears the AP execution area of the memory 17 in response to the notification from the memory management section 33. Thus, the AP that has been loaded so far is deleted, and the private data corresponding to the AP loaded so far is deleted from the memory 17.

In step S17, the AP execution section 36 requests the memory management section 33 to load the AP to be executed and the private data corresponding to the AP (in the following, described as an AP, etc.) into the AP save area of the memory 17. In response to this request, the memory management section 33 reads the encrypted AP, etc., to be executed from the AP save area of the nonvolatile memory 18, and outputs them to the decryption section 35.

In step S18, the decryption section 35 decrypts the encrypted AP, etc., input from the memory management section 33, and returns them to the memory management section 33. In step S19, the memory management section 33 loads the decrypted AP, etc., into the AP execution area of the memory 17, and notifies the AP execution section 36 that the decrypted AP, etc., has been recorded into the AP execution area of the memory 17.

By the processing in steps S13 to S19, after the AP to be started has been loaded into the AP execution area of the memory 17, the processing proceeds to step S20.

In this regard, in step S12, if it is determined that the AP to be started has been loaded into the AP execution area of the memory 17, the processing skips steps S13 to S19, and the processing proceeds to step S20.

In step S20, the AP execution section 36 starts the AP loaded in the AP execution area of the memory 17. In step S21, the AP execution section 36 sends the notification that the specified AP has been started to the controller management section 31. In response to this notification, the controller management section 31 outputs the similar notification to the controller 6.

The AP that has been started in this manner can directly access the private data loaded in the same AP execution area of the memory 17. Also, The AP can access the corresponding Co saved in the nonvolatile memory 18 through the memory management section 33. The AP changing processing is terminated by the above.

By the AP changing processing described above, the AP to be executed is loaded into the AP execution area disposed at the same address in the memory 17 all the time. Thus, the dynamic link at the time of loading and at the time of starting an AP in the AP execution environment becomes unnecessary, and the interpretation of the location information of the AP and the relocation becomes unnecessary. Accordingly, it becomes possible to start the AP at a high speed and to simplify the operation environment.

When the running AP accesses the corresponding private data, since the private data has been loaded in the same AP execution area as that of the AP, it becomes unnecessary for the MMU to perform the logical/physical address conversion. Thus, the running AP can directly access the private data. Accordingly, it becomes possible to process the AP at a high speed, to simplify and to speed up the processing, and to reduce the size of the code.

Also, All the content data is saved in the nonvolatile memory 18 that is not allowed to be directly accessed by the running AP, and thus it becomes possible to restrict the access right to the content data.

Furthermore, at the time of changing APs, the private data corresponding to the AP that has been executed so far is backed up in the nonvolatile memory 18, and that private data is reloaded into the memory 17 when that AP is started next time. Thus, it is possible to achieve the continuity of the processing in the execution environment of the discrete AP in time.

Moreover, the running AP can use the nonvolatile memory 18, etc., as a storage space through the memory management section 33 in addition to the AP execution area of the memory 17.

In this regard, in this specification, the steps executed on the basis of the control program 21 include the processing to be performed in time series in accordance with the described sequence as a matter of course. Also, the steps include the processing which is not necessarily executed in time series, but is executed in parallel or individually.

Also, in this specification, a system represents the entire apparatus including a plurality of apparatuses.

In this regard, an embodiment of the present invention is not limited to the embodiment described above, and various modifications are possible without departing from the spirit and scope of the present invention.

What is claimed is:

1. An information processing apparatus for controlling a reader/writer reading data from and writing data into a non-contact integrated circuit device by executing an application program in accordance with a type of service using the non-contact integrated circuit device, the information processing apparatus comprising:
   a processing unit; and
   a memory, the memory storing the application program, which is executable by the processing unit to perform operations comprising:
   obtaining, by an obtaining section, an application program in accordance with a type of service using the non-contact integrated circuit device;
   encrypting, by an encryption section, the obtained application program and processing data processed by the application program;
   decrypting, by a decryption section, the encrypted application program and corresponding processing data;
   storing the encrypted application program and corresponding processing data in a first storage section;
   loading decrypted application program and corresponding processing data in a second storage section;
   managing, by a management section, the first and the second storage sections; and
   executing, by an execution section, the application program loaded to the second storage section,
   wherein in response to an instruction to start a first application program, the management section reads processing data corresponding to a second application program different from the first application program from the second storage section, causes the encryption section to encrypt the read processing data, stores the encrypted processing data into the first storage section, clears the second storage section, then reads the encrypted first application program and corresponding processing data from the first storage section, causes the decryption section to decrypt the read encrypted first application program and corresponding processing data, and loads the decrypted first application program and corresponding processing data into the second storage section, and wherein the execution section constantly has the same size and address.

2. The information processing apparatus according to claim 1,
   wherein in response to an instruction to start a first application program, the execution section determines whether the first application program has been loaded into the second storage section,
   when it is determined that the first application program has not been loaded into the second storage section, the management section reads processing data corresponding to a second application program different from the first application program from the second storage section, causes the encryption section to encrypt the read processing data, stores the encrypted processing data into the first storage section, clears the second storage section, then reads the encrypted first application program and corresponding processing data from the first storage section, causes the decryption section to decrypt the read encrypted first application program and corresponding processing data, and loads the decrypted first application program and corresponding processing data into the second storage section.

3. The information processing apparatus according to claim 1,
   wherein the first storage section is a nonvolatile memory, and
   the second storage section is a volatile memory.

4. The information processing apparatus according to claim 1, wherein the operations further comprise:
   reading data from and writing data onto the non-contact integrated circuit device.

5. A method of processing information of an information processing apparatus including
   a first storage section storing an encrypted application program and corresponding processing data,
   a second storage section loading a decrypted application program and corresponding processing data, and
   an execution section executing the application program loaded in the second storage section, and
   controlling a reader/writer reading data from and writing data into a non-contact integrated circuit device by executing an application program in accordance with a type of service using the non-contact integrated circuit device, the method of processing information comprising:
   in response to an instruction to start a first application program, reading processing data corresponding to a second application program different from the first application program from the second storage section;
   encrypting the read processing data;
   storing the encrypted processing data into the first storage section;
   clearing the second storage section;
   reading the encrypted first application program and corresponding processing data from the first storage section;
   decrypting the read encrypted first application program and corresponding processing data; and
   loading the decrypted first application program and corresponding processing data into the second storage section,
   wherein the execution section constantly has the same size and address.

6. The method according to claim 5,
   wherein in response to an instruction to start a first application program, the execution section determines whether the first application program has been loaded into the second storage section,
   when the first application program has not been loaded into the second storage section, the execution section reads processing data corresponding to a second application different from the first application program from the second storage section, causes the encryption section to encrypt the read processing data, stores the encrypted processing data into the first storage section, clears the second storage section, then reads the encrypted first application program and corresponding processing data from the first storage section, causes the decryption section to decrypt the read encrypted first application program and corresponding processing data, and loads the decrypted first application program and corresponding processing data into the second storage section.

7. The method according to claim 5,
wherein the first storage section is a nonvolatile memory, and
the second storage section is a volatile memory.

8. The method according to claim 5, further comprising:
reading data from and writing data onto the non-contact integrated circuit device.

9. A non-transitory computer readable medium storing a program for controlling an information processing apparatus including a first storage section for storing processing data corresponding to an encrypted application program, a second storage section for loading processing data corresponding to a decrypted application program, and an execution section for executing the application program loaded in the second storage section, and controlling a reader/writer reading data from and writing data into a non-contact integrated circuit device by executing an application program in accordance with a type of service using the non-contact integrated circuit device, the program being executable to perform operations comprising:

in response to an instruction to start a first application program, reading processing data corresponding to a second application program different from the first application program from the second storage section;

encrypting the read processing data, storing the encrypted processing data into the first storage section;

clearing the second storage section;

reading the encrypted first application program and corresponding processing data from the first storage section;

decrypting the read encrypted first application program and corresponding processing data; and loading the decrypted first application program and corresponding processing data into the second storage section, wherein the execution section constantly has the same size and address.

* * * * *